United States Patent
Salinas

(10) Patent No.: US 11,490,593 B1
(45) Date of Patent: Nov. 8, 2022

(54) PET IDENTIFICATION TAG WITH IMPROVED MOUNT

(71) Applicant: Victor Rey Salinas, Houston, TX (US)

(72) Inventor: Victor Rey Salinas, Houston, TX (US)

(*) Notice: Subject to any disclaimer, the term of this patent is extended or adjusted under 35 U.S.C. 154(b) by 0 days.

(21) Appl. No.: 17/347,333

(22) Filed: Jun. 14, 2021

(51) Int. Cl.
*A01K 11/00* (2006.01)
*A01K 27/00* (2006.01)

(52) U.S. Cl.
CPC ............ *A01K 11/00* (2013.01); *A01K 27/006* (2013.01)

(58) Field of Classification Search
CPC .... A01K 11/00; A01K 27/001; A01K 27/006; A01K 27/008; A44C 25/001; A44C 25/007; A44C 9/00; A45F 5/00; F16B 45/02
USPC ....................................... 40/300; D11/79, 81
See application file for complete search history.

(56) References Cited

U.S. PATENT DOCUMENTS

2019/0208046 A1* 7/2019 Gluck .................... H04M 1/04 13/4

* cited by examiner

*Primary Examiner* — Joshua J Michener
*Assistant Examiner* — Henry Hooper Mudd
(74) *Attorney, Agent, or Firm* — Lai, Corsini & Lapus, LLC; Theodore Lapus

(57) ABSTRACT

An identification tag made from a flexible, durable material, and in a substantially flat, preferably symmetrical shape, and with a front side having a substantially flat surface, and a back side having a substantially flat surface, and a mount extending outward from the back surface and extending partially along the horizontal axis, equidistant from the vertical center. Disposed on the back surface under the mount is a recess extending below the surface, and substantially occupying the same surface area as the area covered by the mount. A ring can pass through the mount so that the ring can be mounted parallel to the surface of the tag. Alternatively, a ring with a tab can be passed through the mount wherein said tab can interlock within the recess under the mount, permitting the ring to be maintained in a supportive position relative to the tag.

3 Claims, 6 Drawing Sheets

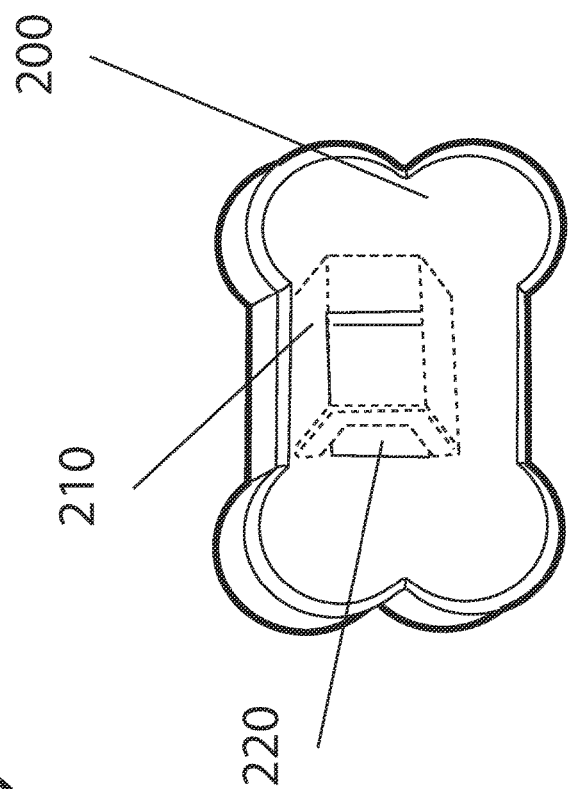
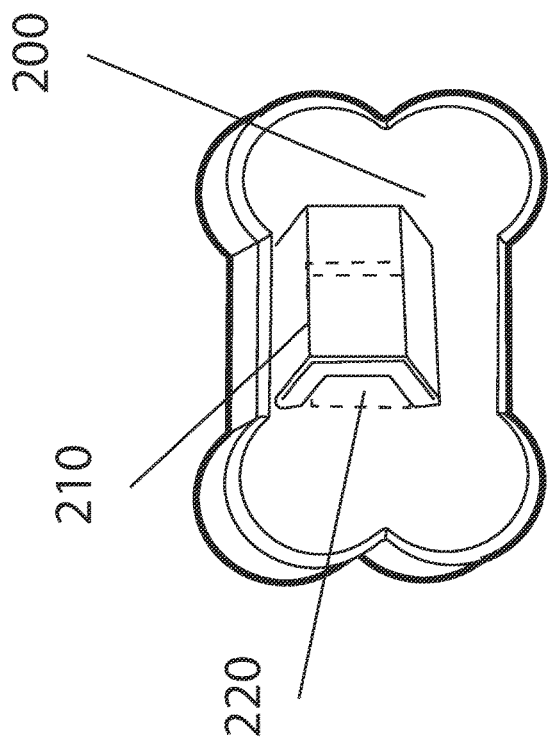

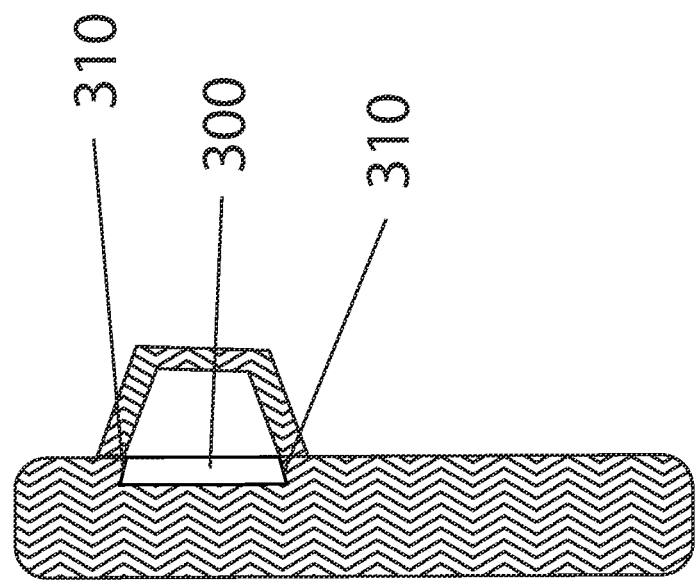

PET IDENTIFICATION TAG WITH IMPROVED MOUNT

FIELD OF THE INVENTION

The invention relates to identification tags, specifically pet identification tags, and more particularly, flexible pet identification tags made of a moldable, markable, durable material that can be attached to conventional pet collars.

BACKGROUND OF THE INVENTION

State and local laws typically require pets to bear identification tags. Pet identification tags exist in a wide variety of shapes and sizes, and are made of typically hard, durable material such as rigid plastic, or metal. The identification tag, having a front and a reverse side, is marked with information about the pet, such as the pet's name, the pet's owner's name and address, and usually other relevant information about the pet.

In the current art, a mounting hole is placed near the edge of the tag, symmetrically along the vertical axis to permit a ring to be attached perpendicularly, that can be further attached to another ring attached to a collar. The multiple rings used to connect the tag to the collar can cause a tag to be inadvertently oriented improperly by the pet's movements, thus not properly displaying the front of the tag.

Further, when a pet passes away, owners often keep the tags as a memento of their pet. Typically, tags are not readily able to be displayed as designed, without additional measures, such as mounting the tag onto a picture from displaying picture of the pet, or other permanent manner of display. If no action to display the tags is taken, the tags are eventually stored out of sight, or possibly misplaced.

SUMMARY OF THE INVENTION

The aspects disclosed herein relate to an improved tag and mount to maintain proper orientation of the tag, and to further provide additional utility as a displayable memento. Not all aspects are required for a particular embodiment.

It is an object of the present invention to provide an improved tag and mount to allow a mounting ring to be attached so that the tag can hang from the pet collar and maintain a proper orientation, without regard to the movements of the pet, wherein the engraving on a the front of the tag is easily accessible for viewing.

It is another object of the invention to provide an improved tag and mount wherein the attached mounting ring can be adjusted and maintained at various angle positions relative to the back surface of the tag, thereby allowing the ring to be used as a support member for the tag to be displayed on a surface as a memento of the pet after it has passed away.

Accordingly, the present invention provides several advantages and objects over the current pet tags. By using a novel and improved mount that permits a mounting ring to pass through the mounting loop parallel to the surface of the tag, the present invention provides an advantage by preventing a tag from inadvertently being oriented improperly. This improved mount and mounting ring can be set at various positions to support the tag akin to an easel, allowing the tag to be displayed as a memento of their pet.

BRIEF DESCRIPTION OF DRAWINGS

Objects, features, and advantages of the present invention will be apparent from the following description of certain representative embodiments of the invention, in conjunction with the accompanying drawings. Other embodiments may be achieved without departing from the scope of the invention and improvements embodied in the disclosure, and in which:

FIG. 2a is a reverse view of the present invention displaying the mount;

FIG. 2b is a reverse view of the present invention showing the recess beneath the mount;

FIG. 3 is a perspective view of the present invention showing the recess.

DETAILED DESCRIPTION OF THE DRAWINGS

Figure 1:
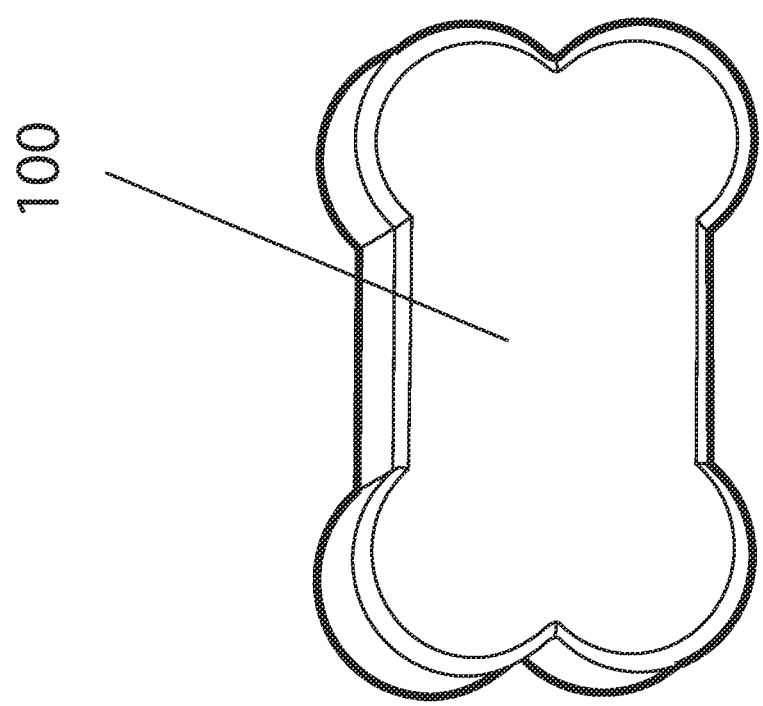
FIG. 1 is a front view of the present invention in one embodiment.

The invention is described as set forth in FIG. 1-6b. FIG. 1 shows the front of the tag embodied in one possible shape. The tag can be embodied in a variety of shapes suitable for use as a tag, though the preferred shape is one that is symmetrical, wider along the horizontal axis, and of suitable size for a pet tag. The tag comprises a front, substantially flat surface 100, that provides a suitable area for marking or engraving with information such as the pet's name, and owner's contact information. The tag can be made from flexible materials, such as polyvinyl chloride ("PVC") and similar plastics, latex, rubber, or synthetic rubber, or other known material in the art that are soft, durable, flexible, and capable of being permanently marked on, or engraved.

As shown in FIG. 2a and FIG. 2b, the back surface 200 of the tag is substantially flat and is also suitable for marking or engraving in the same manner as the front surface 100 shown in FIG. 1. The back surface further comprises a mount 210 that extends outward from the back 200 of the tag that allows passage horizontally under the mount to secure a mounting ring. The mount is disposed substantially centrally along the horizontal axis. The mount is made from the same durable material as the tag, and is preferably constructed as a single piece.

A recess 220 is disposed on the back surface of the tag under the mount as shown in FIG. 2a and FIG. 2b. The recess permits the ring to rotate when desired by providing sufficient room for the ring to pass against the back of the tag. Without the recess, the mounting loop 210 would need to be sufficiently larger wherein it would permit the tag to swing freely on the ring, thereby defeating the improvements of the invention. Further, the ring would not be able to be rotated and maintained in a position necessary to display the tag.

In a preferred embodiment, the interior walls 310 of the recess 300 that extend along the horizontal axis of the tag are beveled as shown in FIG. 3. As shown in a later drawing a tab on a mounting ring can interlock along the corner formed between the beveled interior wall and base of the recess.

Figure 4C:
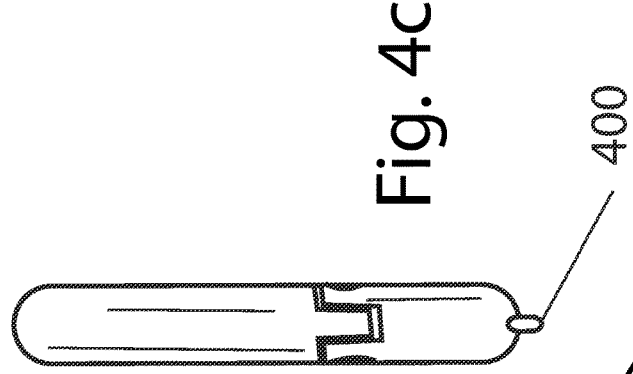
FIG. 4c is a perspective side view of a clasp ring in a closed position
Figure 4B:
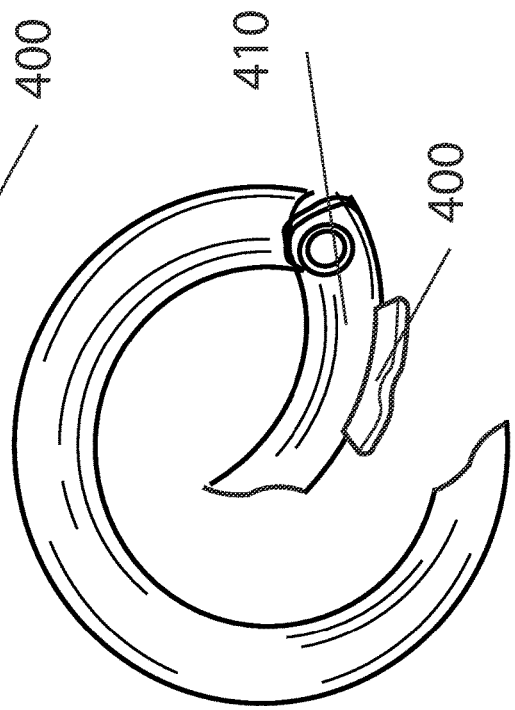
FIG. 4b is a perspective view of a clasp ring in an open position.
Figure 4A:
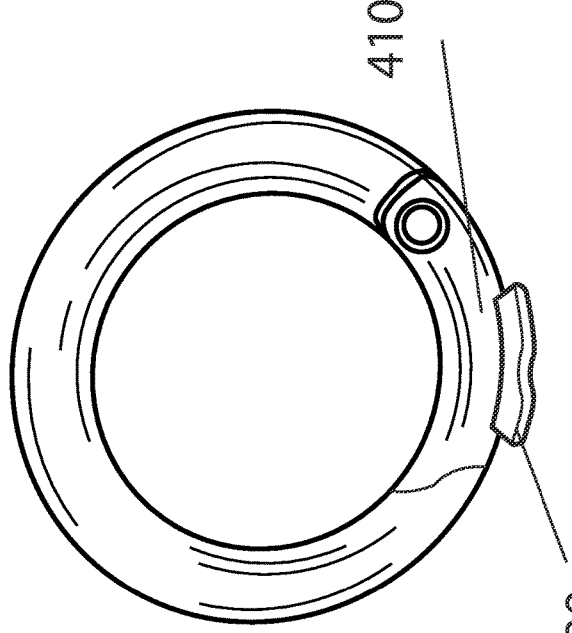
FIG. 4a is a perspective view of a clasp ring in the closed position.

A ring as shown in FIG. 4a, FIG. 4b, and FIG. 4c with a tab 400 and clasp 410 is used with the tag. The clasp 410 opens as shown in FIG. 4b, permitting the ring to be placed through the mount. The clasp mechanism is one that is commonly known in the art.

Figure 5A:
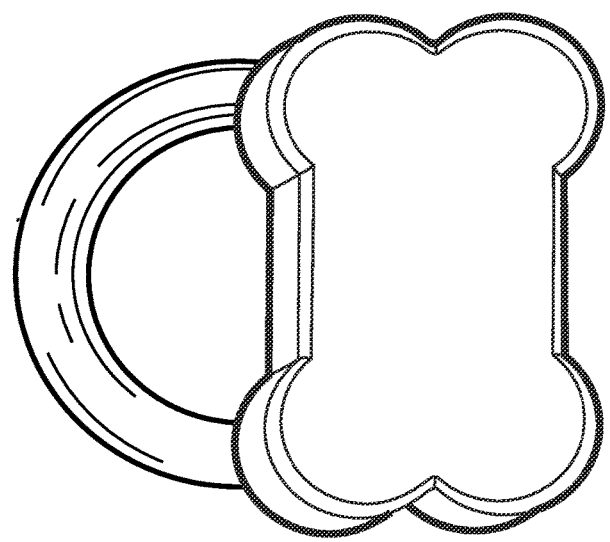
FIG. 5a is a front view of the invention with the clasp ring attached through the mount.
Figure 5B:
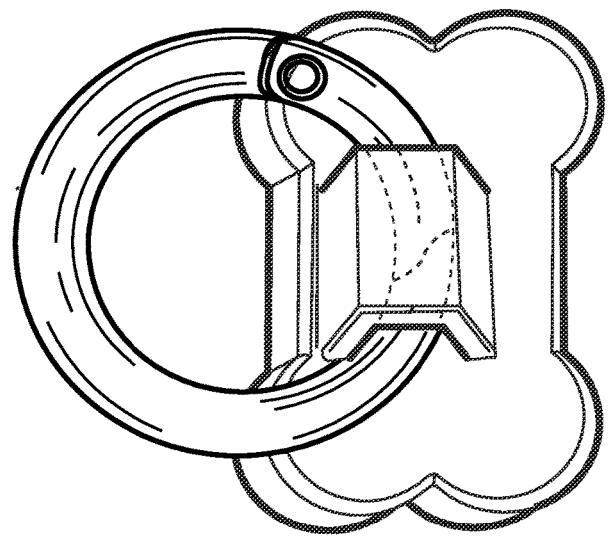
FIG. 5b is a reverse view of the invention with the clasp ring attached through the mount.

As shown in FIG. 5a and FIG. 5b, the method of attaching the mounting ring through the mount results in the mounting ring oriented parallel to the tag, The mounting ring can then be attached a jump ring hanging from a pet collar. This method of attachment of the mounting ring keeps the tag and ring in the same orientation, and prevents the tag from being flipped or reversed as a result of the pet's movements.

Figure 6B:
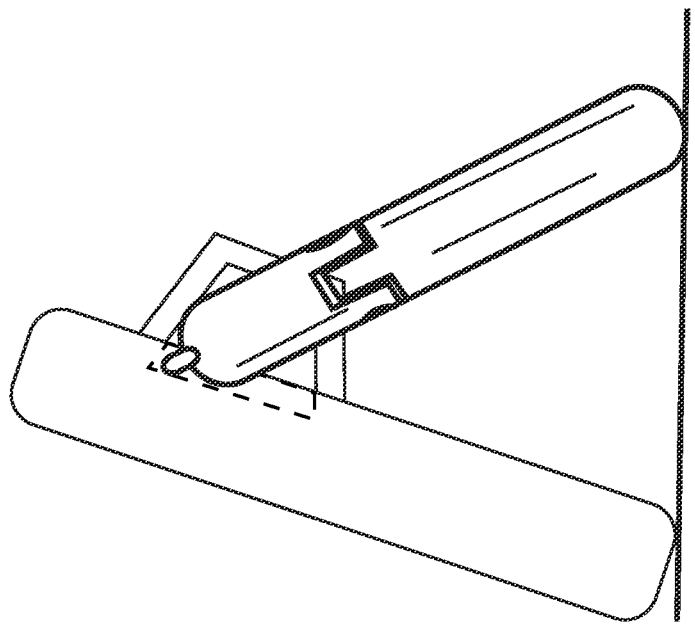
FIG. 6a is a side view of the invention showing the ring clasp in one position; and, FIG. 6b is a side view of the invention showing the ring clasp in another position.
Figure 6A:
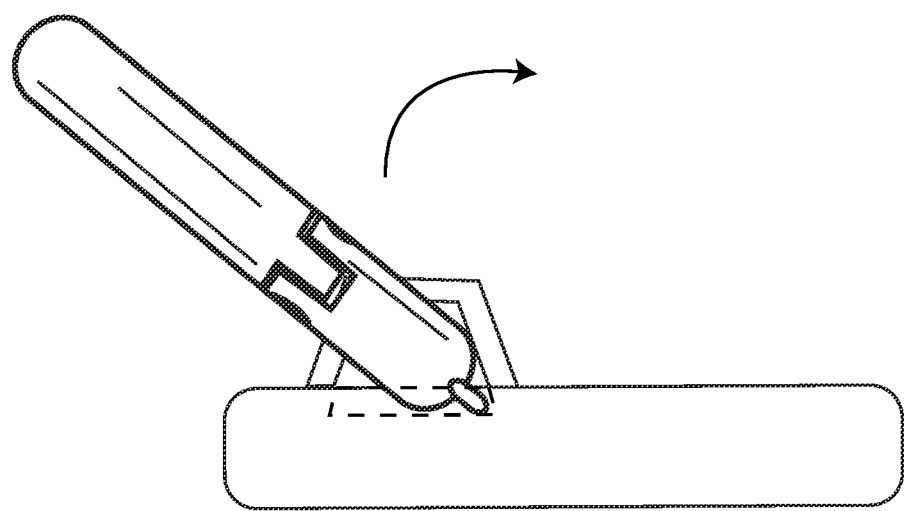

The flexible material used to construct the tag permits a mounting ring with the tab to be positioned such that the tab interlocks into a corner as shown in FIGS. 6a and 6b, thereby securing the ring into a desired position. In one embodiment, the opening of the recess is approximately 13/32" in width, approximately 9/32" in height, and approximately 3/64" in depth. As the recess extends further into the tag, the height dimension of the recess increases symmetrically along the vertical axis to approximately 5/16", thereby creating beveled walls along the top interior and bottom interior walls of the recess. A mounting ring with a tab of a corresponding width of 13/32" can be used. The preferred gauge of the ring is such that the exterior diameter of the ring fits snugly within the interior of the mount such that the ring does not slide freely inside the mount.

It will be understood that other modifications and variations of the invention may be permitted without departing from the spirit and scope of the invention as set forth.

What is claimed is:

1. A pet identification tag, attachable to a pet collar, comprising:
   a front surface, and a reverse surface;
   a mount transversely disposed on the reverse surface, said mount further comprising:
      a first open end;
      a second open end; and,
      a continuous opening between the first open and the second open end;
   a clasp ring rotatably engaged through the first open end and second open end of said mount; and,
   a recessed area disposed under the mount on the reverse surface, said recessed area further comprising:
      a first wall adjoined to the surface of the recessed area;
      a second wall adjoined to the surface of the recessed area;
      a third wall adjoined to the surface of the recessed area;
      a fourth wall adjoined to the surface of the recessed area;
      wherein the first wall, second wall, third wall, and fourth wall define the recessed area under the mount in that of a rectangular shape.

2. The pet identification tag of claim 1 wherein the clasp ring further comprises a tab mounted on the outer edge of the ring.

3. A method for displaying the pet identification tag of claim 2 comprising the steps of:
   adjusting the angle of the clasp ring in relation to the tag until the tab on the mounting ring engages a corner formed between a wall and the surface of the recessed area wherein the tag is supported by the clasp ring; and,
   placing the tag on a flat surface wherein the mounting ring supports the tag for display.

\* \* \* \* \*